United States Patent
Hall

(10) Patent No.: US 9,925,862 B2
(45) Date of Patent: Mar. 27, 2018

(54) TURBINE COMPRESSOR WHEEL WITH AXIALLY EXTENDED BLADES

(71) Applicant: Bullseye Power, LLC, Muskegon, MI (US)

(72) Inventor: David M. Hall, Muskegon, MI (US)

(73) Assignee: Bullseye Power LLC, Muskegon, MI (US)

( * ) Notice: Subject to any disclaimer, the term of this patent is extended or adjusted under 35 U.S.C. 154(b) by 384 days.

(21) Appl. No.: 14/604,936

(22) Filed: Jan. 26, 2015

(65) Prior Publication Data
US 2016/0215787 A1    Jul. 28, 2016

(51) Int. Cl.
| | |
|---|---|
| *B60K 13/04* | (2006.01) |
| *F01D 5/02* | (2006.01) |
| *F04D 29/26* | (2006.01) |
| *F04D 29/30* | (2006.01) |
| *F04D 29/28* | (2006.01) |

(52) U.S. Cl.
CPC ............... *B60K 13/04* (2013.01); *F01D 5/025* (2013.01); *F04D 29/266* (2013.01); *F04D 29/284* (2013.01); *F04D 29/30* (2013.01); *F05D 2220/40* (2013.01); *F05D 2250/232* (2013.01); *F05D 2250/281* (2013.01)

(58) Field of Classification Search
CPC ....... B60K 13/04; F01D 5/025; F04D 29/266; F04D 29/284; F04D 29/30; F05D 2220/40

See application file for complete search history.

(56) References Cited

U.S. PATENT DOCUMENTS

| 4,705,463 | A | * | 11/1987 | Joco | .................. | F01D 5/025 |
| | | | | | | 29/889.2 |
| 4,986,733 | A | * | 1/1991 | Fleury | .................. | F01D 5/025 |
| | | | | | | 403/361 |
| 8,696,316 | B2 | * | 4/2014 | Decker | ................. | F04D 29/023 |
| | | | | | | 415/119 |
| 8,794,914 | B2 | * | 8/2014 | Hommes | ............... | F04D 29/023 |
| | | | | | | 415/206 |
| 8,820,468 | B2 | * | 9/2014 | Sekiya | .................. | B60K 13/04 |
| | | | | | | 180/309 |
| 9,664,050 | B2 | * | 5/2017 | Hippen | ................. | F01D 25/166 |

FOREIGN PATENT DOCUMENTS

WO    WO 2010134569 A1 * 11/2010 ............. B22F 3/225

* cited by examiner

*Primary Examiner* — Richard Edgar
*Assistant Examiner* — John S Hunter
(74) *Attorney, Agent, or Firm* — Gunther J. Evanina; Butzel Long

(57) ABSTRACT

A compressor wheel for a turbocharger has an improved geometry that provides improved performance as compared with a comparably sized conventional compressor wheel by having the radially inward portion of the primary blades sweep upwardly into the upper region of the hub portion. The through bore and integral nut of conventional compressor wheels is eliminated and replaced with a blade extension that has an angled upper edge which extends downwardly and radially outwardly from the hub portion, effectively increasing the size of the blade, the amount of air movement and the amount of power generated, without increasing the overall cost, size or mass of the compressor wheel.

15 Claims, 6 Drawing Sheets

TURBINE COMPRESSOR WHEEL WITH AXIALLY EXTENDED BLADES

CROSS-REFERENCE TO RELATED APPLICATIONS

Not applicable.

FIELD OF THE DISCLOSURE

This disclosure relates to turbochargers and more particularly to a compressor wheel having a geometry that provides improved performance.

BACKGROUND OF THE DISCLOSURE

Turbochargers are used in conjunction with internal combustion engines in vehicles (e.g., trucks, automobiles, tractors, etc.) to increase power output, improve efficiency, lower emissions or to achieve a combination of these advantages or improvements. A turbocharger is comprised of a turbine that converts kinetic energy in the combustion products exhausted from the engine into mechanical work that is transmitted to a compressor that draws in ambient air and discharges the air at a higher pressure. The higher pressure air discharged from the turbocharger compressor is conveyed to the air intake manifold of the internal combustion engine, providing a higher mass flow of oxygen to the cylinders. The increased mass flow of oxygen is accompanied by an increased mass flow of fuel to the cylinders leading to more combustion and power per piston stroke.

Shown in FIGS. 1 and 2 is a conventional compressor wheel 100. Compressor wheel 100 has a base portion 112, a hub portion 114 that projects generally perpendicularly from the base portion 112. The upper surface 116 of base portion 112 gradually curves upwardly from wheel edge 118 toward hub portion 114. Projecting radially outwardly from hub portion 114 and upwardly from base portion 112 are a plurality of primary blades 120. Primary blades 120 are spaced apart by equal angles around the hub portion 112. In the illustrated compressor wheel 100, there are six primary blades 120 separated by 60 degree angles. Disposed between each pair of adjacent primary blades 120 is a shorter secondary blade 122. Each of the primary and secondary blades 120, 122 have an upper inducer edge 124 and 126, respectively, a vertical inducer edge 128 and 130, respectively, an upper exducer edge 132 and 134, respectively, and a vertical exducer edge 136 and 138, respectively. The vertical inducer edges 128 and 130 define the radial outer boundary of the inducer section and inducer diameter 140 of the compressor wheel 100, and the vertical exducer edges 136 and 138 define the radial outer boundary of the exducer section and exducer diameter 142 of the compressor wheel 100. Generally, the inducer portion of the compressor wheel 100 and blades 120, 122 draw air axially inwardly into the compressor volume defined by a compressor housing, and the exducer portion of the compressor wheel 100 and blades 120, 122 cause compressed air to exit the compressor radially. The shorter or secondary blades 122, also known as splitter blades, are believed to allow higher intake air mass flow through the inducer at very high rotational speeds. While secondary blades 122 can be desirable for certain applications, compressor wheels having all blades being identical are also very common and useful.

Conventional compressor wheels 100 for turbochargers have a threaded through bore 144 that is threadingly engaged with external threads of a shaft coupled to a turbine wheel configured to be driven by exhaust gases from an internal combustion engine. The upper end of hub portion 114 is provided with an integral hexagonal nut 146 that allows compressor wheel 100 to be tightly secured to the shaft, such as with a wrench.

SUMMARY OF THE DISCLOSURE

Disclosed is a compressor wheel for a turbocharger that has an improved geometry that provides reduced mass and inertia and increased air flow and power as compared with a conventional turbocharger compressor wheel having the same overall height and diameter.

This improvement is achieved by eliminating the through bore and integral nut and extending the primary blades upwardly into the upper end of the hub portion of the wheel to and beyond where the integral nut is located on a conventional compressor wheel. This modification also makes it possible to taper the upper end of the hub portion of the compressor wheel, eliminating some mass from this region of the wheel. This has the added advantage of reducing inertia and reducing the turbocharger lag or delay (i.e., the time between demand for increased power and increased intake pressure), while increasing air flow and boost (the amount by which intake manifold pressure exceeds ambient air pressure).

In certain aspects of this disclosure, the improved compressor wheel includes a metal body having a generally circular shaped base portion, a hub portion extending perpendicularly from the base portion, and a plurality of primary blades, wherein each primary blade extends upwardly from the base portion and radially outwardly from the hub portion, and each of the plurality of primary blades has an inducer portion that has an upper edge which includes an angled section that extends downwardly and radially outwardly from the hub portion and a second substantially horizontal section that extends radially outwardly from the angled section to a radially distal end of the upper edge and a vertical edge that extends downwardly from the radially distal end of the upper edge to an exducer portion of the primary blade. The exducer portion of the primary blade has an upper edge that extends radially outwardly and downwardly at an angle from the vertical edge of the inducer portion and a radially distal vertical edge that extends downwardly from the upper edge of the exducer portion to the base portion.

In certain aspects of this disclosure, the angle between the axial direction of the hub portion and the angled section of the upper edge of the inducer portion of each of the plurality of primary blades is from 10 to 40 degrees or from 20 to 35 degrees.

In certain aspects of this disclosure, the angle between an axial direction of the hub portion and the angled section of the upper edge of the exducer portion of the plurality of primary blades is from 45 to 75 degrees or from 55 to 70 degrees.

In certain aspects of this disclosure, the compressor wheel may include only primary blades, each of which is identical.

In certain other aspects of this disclosure, the compressor wheel may include at least two different types of blades, including a primary type of blade, and a shorter secondary type of blade (or splitter blade). The two different types of blades can be arranged alternately around the circumference of the hub portion.

In certain aspects of this disclosure, the compressor wheel has a height measured from a bottom of the base portion to a top of the hub and a diameter measured across the width of the base portion, and includes an internally threaded bore that extends axially upwardly from the base portion and terminates within the hub portion such that the internally threaded bore does not extend through a top of the hub portion, and whereby an upper end of the hub portion has a reduced diameter, and a height and a width of the inducer portion of the primary blades is increased relative to a compressor wheel having a through bore, without increasing the height or the diameter of the compressor wheel.

In certain aspects of this disclosure, the improved compressor wheel is incorporated into a turbocharger system that also includes a turbine wheel configured to be driven by exhaust gases from an internal combustion engine, and a shaft axially coupled at a first end to the turbine wheel and at a second (opposite) end to the compressor wheel.

In certain aspects of this disclosure, the improved compressor wheel is incorporated into a motor vehicle having a frame; an internal combustion engine supported on the frame; a turbine wheel configured to be driven by exhaust gases from the internal combustion engine; a shaft axially coupled at a first end to the turbine wheel; and a compressor including the compressor wheel axially coupled to a second end of the shaft.

DETAILED DESCRIPTION

Figure 1:
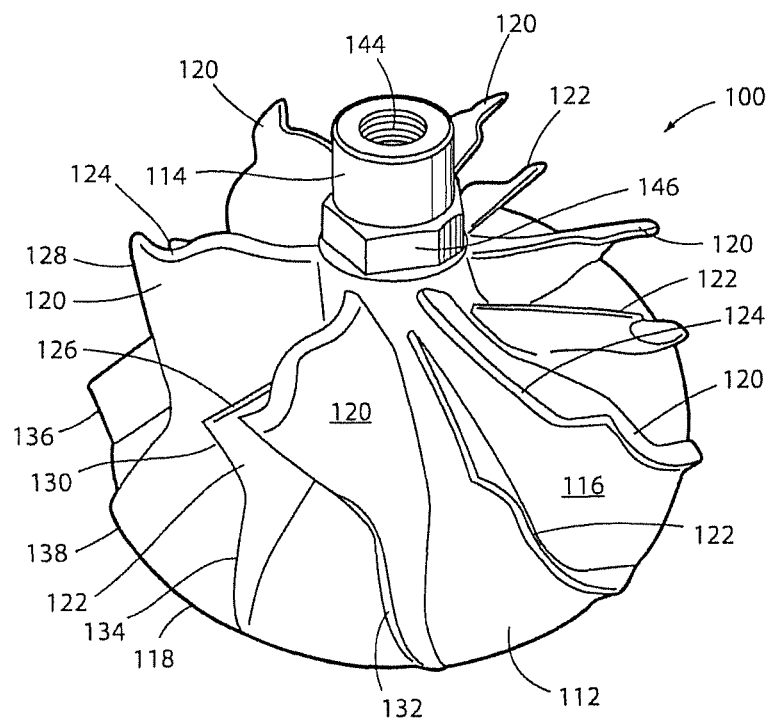
FIG. 1 is a perspective view of a conventional (Prior Art) turbocharger compressor wheel.
Figure 2:
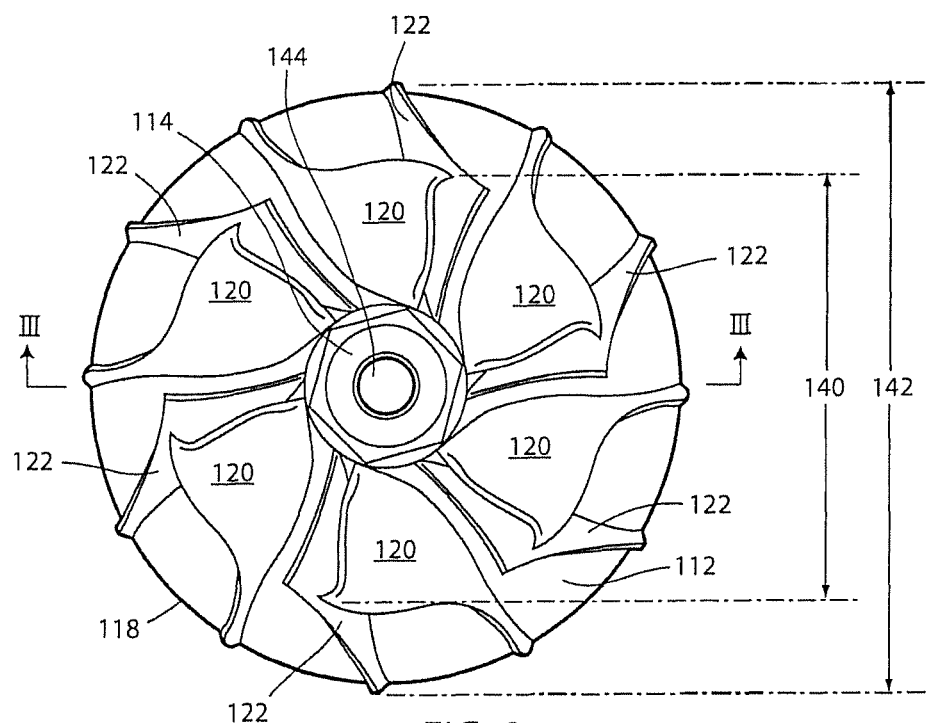
FIG. 2 is a top view of the turbocharger compressor wheel of FIG. 1.
Figure 3:
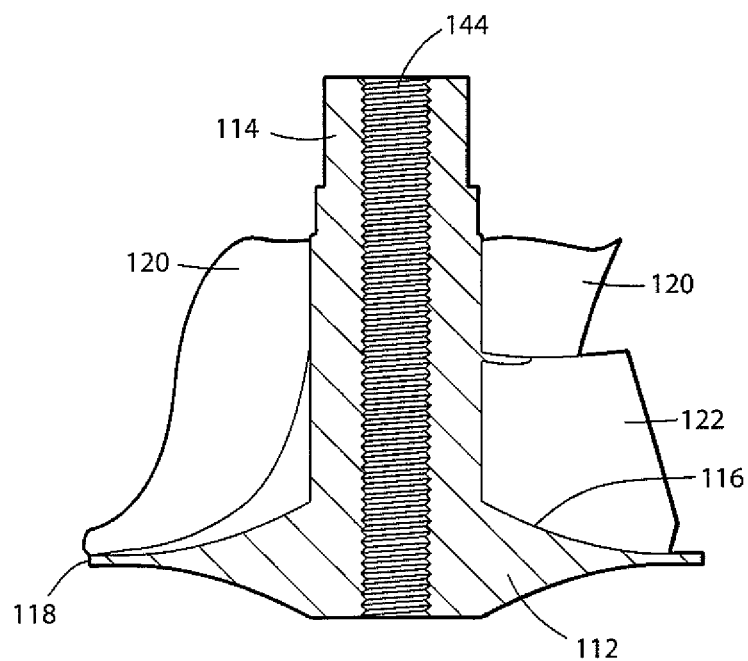
FIG. 3 is a cross-sectional elevation view of the turbocharger compressor wheel of FIGS. 1 and 2, as viewed along lines 3-3 of FIG. 2.
Figure 4:
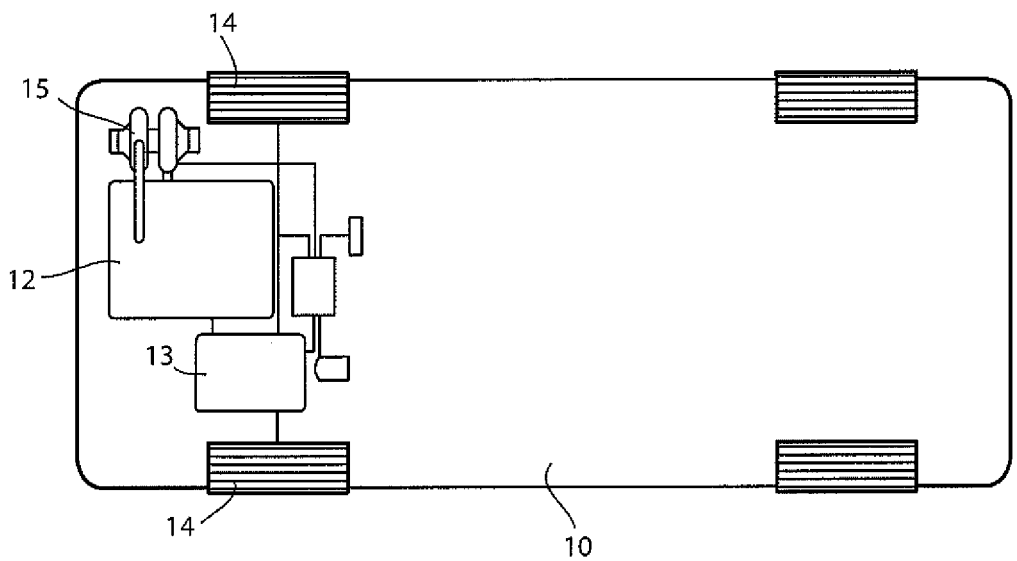
FIG. 4 is a schematic illustration of a motor vehicle incorporating a turbocharger having an improved compressor wheel in accordance with this disclosure.

Shown in FIG. 4 is a schematic illustration of a vehicle 10 having an internal combustion engine 12 mechanically linked to a transmission 13 that drive wheels 14. A turbocharger 15 is provided to increase the efficiency of and/or the power from the engine 12.

Figure 5:
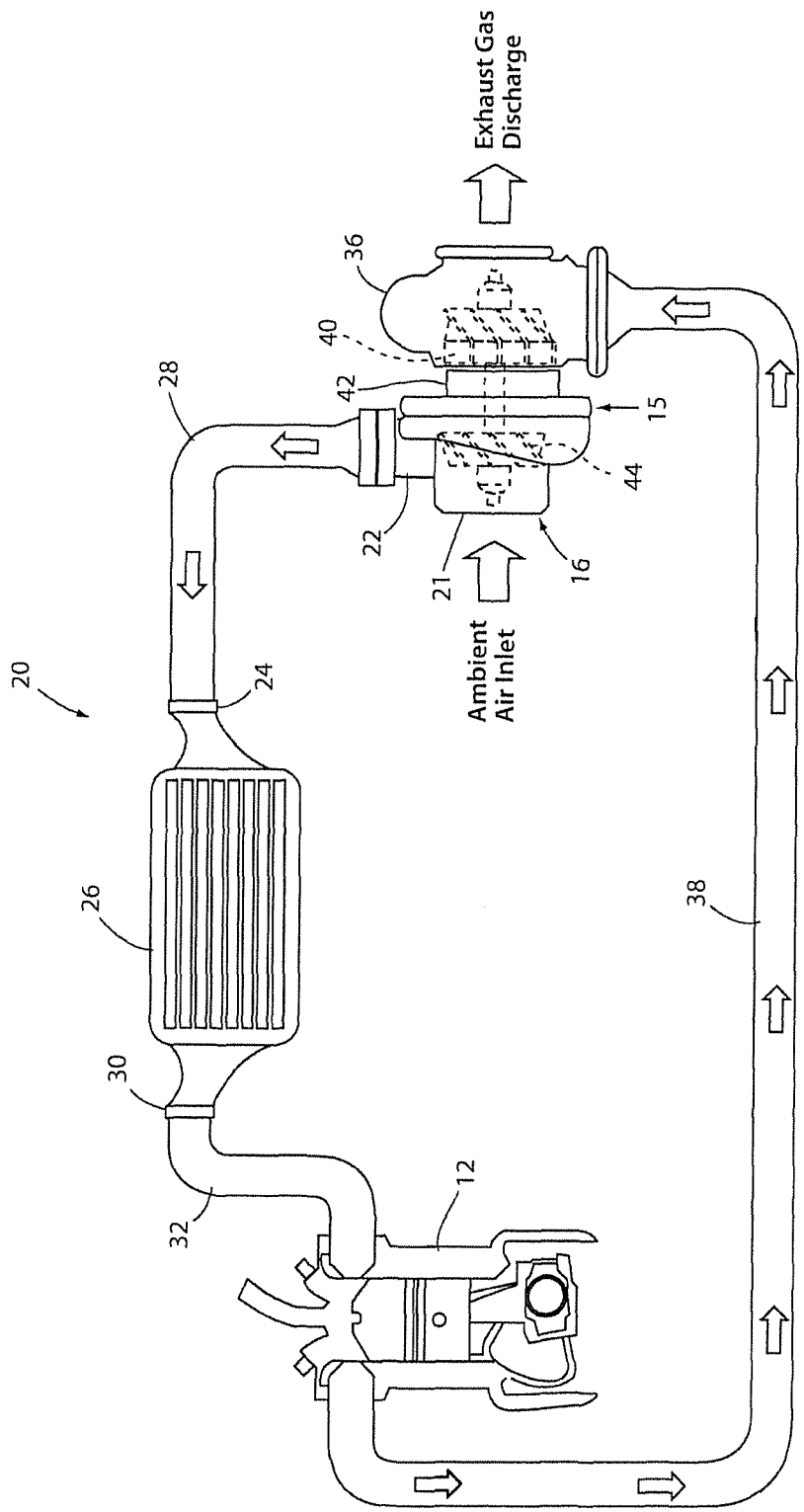
FIG. 5 is a schematic representation of a turbocharged internal combustion engine.

A turbocharger system 20 is shown in FIG. 5. The system 20 incorporates turbocharger 15 which includes a compressor 16 that draws ambient air into inlet 21 and discharges compressed air from discharge outlet 22. The compressed air from discharge outlet 22 is conveyed to an air cooler inlet port 24 of an air cooler 26 via pipe 28. Air flows over fins of the cooler 26 as the vehicle moves, cooling the compressed air before it exits cooler 26 from cooler outlet port 30 and is conveyed to an air intake manifold of engine 12 via pipe 32. Combustion products exhausted from engine 12 flow to a turbine 36 via a pipe 38. The exhaust gases cause rotation of a turbine wheel 40 that is connected with a shaft 42 that drives a compressor wheel 44.

Figure 6:
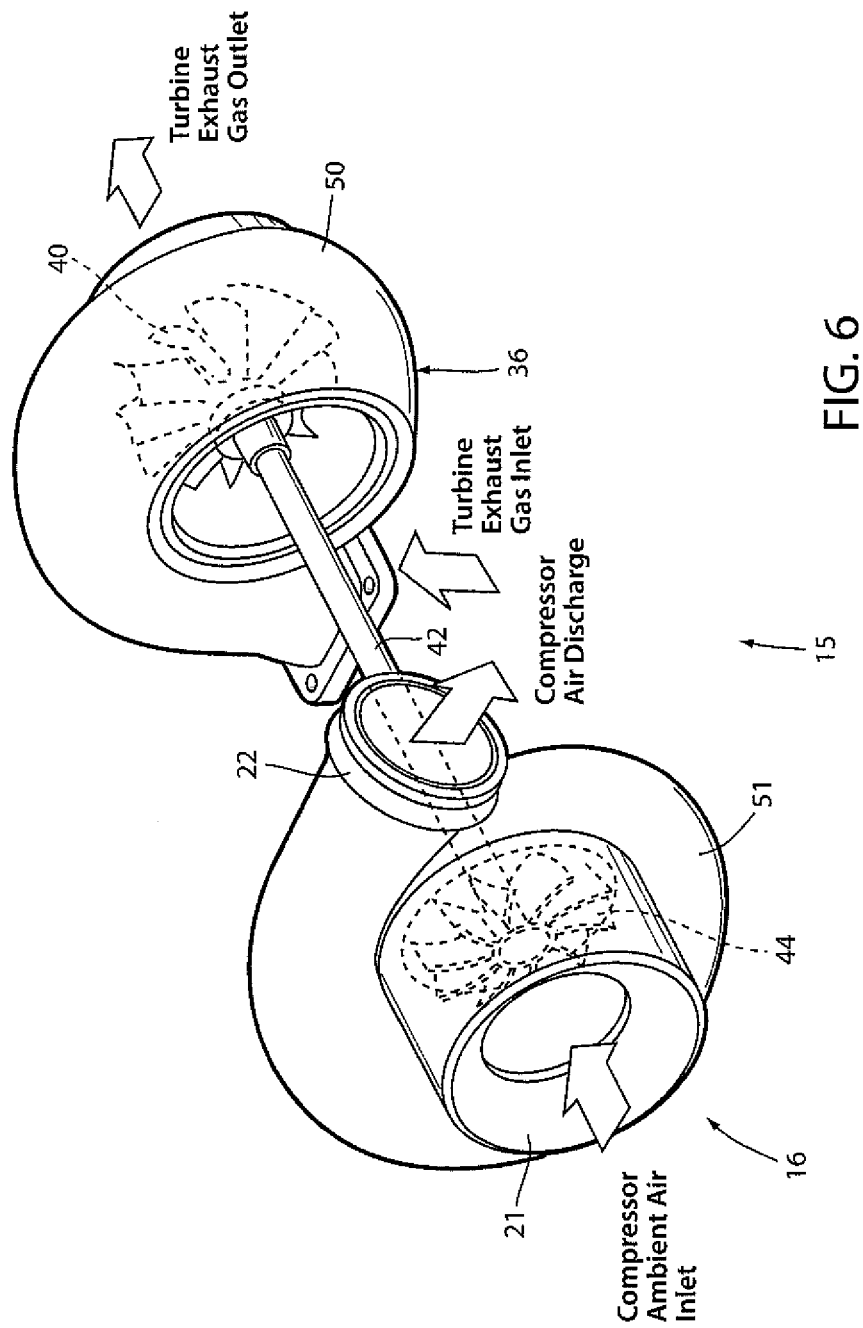
FIG. 6 is a perspective view of a turbocharger with a portion broken away to show internal components thereof.

Details of turbocharger 15 are shown in FIG. 6. Each of compressor 16 and turbine 36 has a housing 50 and 51, respectively, that define the inlets and outlets for air and combustion products, respectively.

Figure 7:
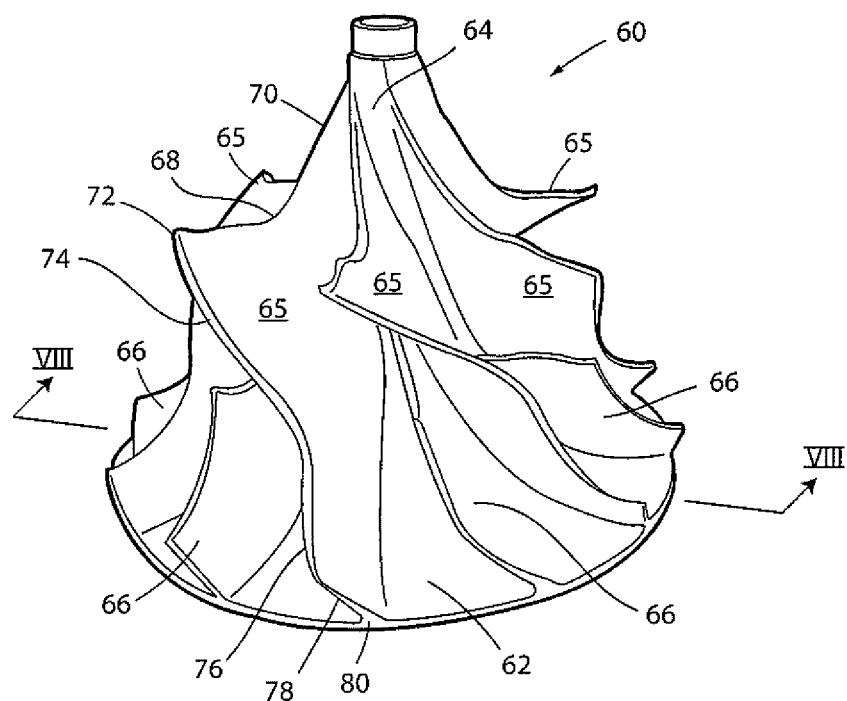
FIG. 7 is a perspective view of an improved turbocharger compressor wheel in accordance with this disclosure.
Figure 8:
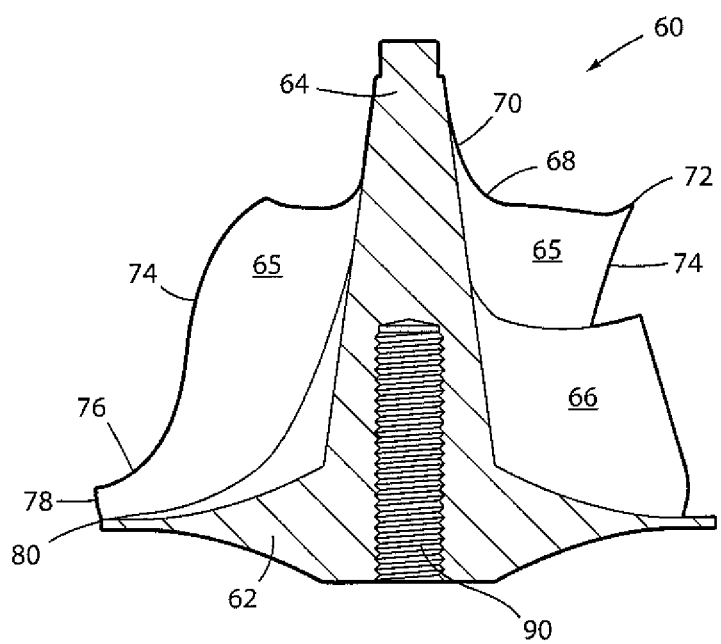
FIG. 8 is a cross-sectional view of the compressor wheel of FIG. 7, as viewed along lines 8-8 of FIG. 7.
Figure 9:
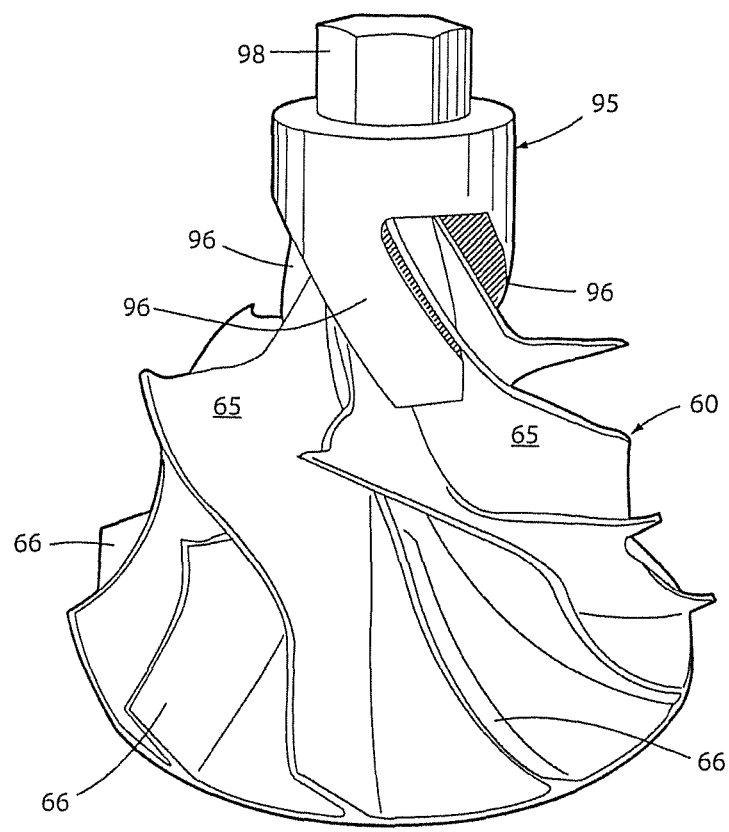
FIG. 9 is a perspective view of a tool fitted to the compressor wheel shown in FIGS. 7 and 8 to facilitate securement of the compressor wheel to a shaft used for coupling the turbine wheel with the compressor wheel.

An improved compressor wheel 60 is shown in FIGS. 7-9. Compressor wheel 60 includes a base portion 62 and a hub portion 64 that extends perpendicularly from the generally circular shaped base portion 62. Compressor wheel 60 includes a plurality of primary blades 65 and a plurality of splitter or secondary blades 66. Primary blades 65 and secondary blades 66 are arranged alternately and are angularly spaced apart, with the angles between adjacent blades being equal. The secondary blades have the same width as the primary blades but are shorter.

The compressor wheel 60 is comprised of a unitary metal body that can be made by machining from a single billet or by a metal casting process. Aluminum and aluminum alloys can be used.

Each of the plurality of primary blades 65 extends upwardly from the base portion 62 and radially outwardly from the hub portion 64. Each blade 65 has an inducer portion generally defined by an upper edge 68 having an angled section 70 that extends downwardly and radially outwardly from the hub portion 64 and a substantially horizontal section that extends radially outwardly from the angled section 70 to a radially distal end 72 of the upper edge 68, and by a vertical edge 74 that extends downwardly from the radially distal end 72 of the upper edge 68 to an exducer portion of the blade 65. The exducer portion of the primary blade 65 is defined by an upper edge 76 that extends radially outwardly and downwardly at an angle from the vertical edge 74 of the inducer portion of the blade 65 and by a radially distal vertical edge 78 that extends downwardly from the upper edge 76 of the exducer portion to the base portion 62.

The term "vertical" as used herein refers to the vertical direction of FIG. 7 and coincides with the axial direction of the hub portion 64. The term "horizontal" as used herein refers to the horizontal direction of FIG. 7 and coincides with the bottom of base portion 62.

The upper surface of base portion 62 can, as illustrated, curve upwardly from edge 80 of base portion 62 toward hub portion 64.

The generally triangular shaped section of blade 65 which extends upwardly above the generally horizontal upper edge 68 into the region of the compressor wheel conventionally used for applying a wrench adds surface area to the inducer section of the blade, effectively increasing air flow (e.g., about 3.5%), without changing the diameter or vertical height of the compressor wheel, relative to a conventional compressor wheel. This increased air flow results in increased power output and improved efficiency.

The angle between the axial or vertical direction of the hub portion 64 and the angled section 70 of the upper edge 68 of the inducer portion of each primary blade 65 can be from about 10 degrees to about 40 degrees, such as from about 20 degrees to about 35 degrees.

The angle between the axial or vertical direction of the hub portion 64 and the angled upper edge 76 of the exducer portion of each primary blade 65 can be from about 45 degrees to about 75 degrees, such as from about 55 degrees to about 70 degrees.

The compressor wheel 60 can include a plurality of secondary or splitter blades 66, each splitter blade disposed between a pair of primary blades 65. However, the improved compressor wheels of this disclosure can have only a single type of blade, two different types of blades, or more than two different types of blades.

The improved compressor wheels of this disclosure can have a hub portion 64 that is more tapered at the top than a conventional wheel having an integral nut and through bore. Compressor wheel 60 can include an internally threaded bore 90 that does not extend all the way to and through a top of the hub portion 64, but rather terminates within the hub portion 64. In order to facilitate securement of the compressor wheel 60 to a shaft coupled to the turbine wheel of a turbocharger, a specially configured tool 95 having prongs 96 that conform with and engage blades 65, 66 of wheel 60 is provided. An integral hexagonal wrench engagement feature 98 is provided on tool 95 to allow wheel 60 to be tightened onto the shaft using a wrench.

While the present invention is described herein with reference to illustrated embodiments, it should be understood that the invention is not limited hereto. Those having ordinary skill in the art and access to the teachings herein will recognize additional modifications and embodiments within the scope thereof. Therefore, the present invention is limited only by the claims attached herein.

What is claimed is:

1. A compressor wheel for a turbocharger, comprising:
a metal body having a generally circular shaped base portion, a hub portion extending perpendicularly from the base portion, and a plurality of primary blades, each of the plurality of primary blades extending upwardly from the base portion and radially outwardly from the hub portion, and each of the plurality of primary blades having an inducer portion that has an upper edge which includes a first section that extends downwardly and radially outwardly at an angle from the hub portion to define a triangular shaped portion of the blade, a substantially horizontal section that extends radially outwardly from the first section to a radially distal end of the upper edge, and a convex edge that extends downwardly from the radially distal end of the upper edge to an exducer portion of the primary blade, the exducer portion of the primary blade having an upper concave edge that extends radially outwardly and downwardly from the inducer portion and a radially distal vertical edge that extends downwardly from the upper edge of the exducer portion to the base portion.

2. The compressor wheel of claim 1, in which the angle between an axial direction of the hub portion and the angled section of the upper edge of the inducer portion of each of the plurality of primary blades is from 10 to 40 degrees.

3. The compressor wheel of claim 1, in which the angle between an axial direction of the hub portion and the angled upper edge of the exducer portion of each of the plurality of primary blades is from 45 to 75 degrees.

4. The compressor wheel of claim 1, further comprising a plurality of secondary blades, each secondary blade being disposed between radially adjacent primary blades, and each secondary blade having a height and surface area that is less than the height and surface area of a primary blade.

5. The compressor wheel of claim 1, in which the compressor wheel has a height measured from a bottom of the base portion to a top of the hub portion and a diameter measured across the width of the base portion and includes an internally threaded bore extending axially along and terminating within the hub portion such that the internally threaded bore does not extend through a top of the hub portion.

6. A turbocharger system for a vehicle, comprising:
a turbine including a turbine wheel configured to be driven by exhaust gases from an internal combustion engine;
a shaft axially coupled at a first end to the turbine wheel;
a compressor including a compressor wheel axially coupled at a second end of the shaft, the compressor wheel including a metal body having a generally circular shaped base portion, a hub portion extending perpendicularly from the base portion, and a plurality of primary blades, each of the plurality of primary blades extending upwardly from the base portion and radially outwardly from the hub portion, and each of the plurality of primary blades having an inducer portion that has an upper edge which includes a first section that extends downwardly and radially outwardly at an angle from the hub portion to define a triangular shaped portion of the blade, and a substantially horizontal section that extends radially outwardly from the first section to a radially distal end of the upper edge, and a convex edge that extends downwardly from the radially distal end of the upper edge to an exducer portion of the primary blade, the exducer portion of the primary blade having an upper concave edge that extends radially outwardly and downwardly at an angle from the inducer portion and a radially distal vertical edge that extends downwardly from the upper edge of the exducer portion to the base portion.

7. The turbocharger system of claim 6, in which the angle between an axial direction of the hub portion and the angled section of the upper edge of the inducer portion of each of the plurality of primary blades is from 10 to 40 degrees.

8. The turbocharger system of claim 6, in which the angle between an axial direction of the hub portion and the angled section of the upper edge of the exducer portion of each of the plurality of primary blades is from 45 to 75 degrees.

9. The turbocharger system of claim 6, further comprising a plurality of secondary blades, each secondary blade being disposed between radially adjacent primary blades, and each secondary blade having a height and surface area that is less than the height and surface area of a primary blade.

10. The turbocharger system of claim 6, in which the compressor wheel has a height measured from a bottom of the base portion to a top of the hub portion and a diameter measured across the width of the base portion and includes an internally threaded bore extending axially along and terminating within the hub portion such that the internally threaded bore does not extend through a top of the hub portion.

11. A motor vehicle comprising:
a vehicle frame;
an internal combustion engine supported on the vehicle frame;
a turbine wheel configured to be driven by exhaust gases from the internal combustion engine;
a shaft axially coupled at a first end to the turbine wheel; and
a compressor including a compressor wheel axially coupled at a second end of the shaft, the compressor wheel including a metal body having a generally circular shaped base portion, a hub portion extending perpendicularly from the base portion, and a plurality of primary blades, each of the plurality of primary blades extending upwardly from the base portion and radially outwardly from the hub portion, and each of the plurality of primary blades having an inducer portion that has an upper edge which includes a first section that extends downwardly and radially outwardly at an angle from the hub portion to define a triangular shaped portion of the blade, a substantially horizontal section that extends radially outwardly from the first section to a radially distal end of the upper edge, and a convex edge that extends downwardly from the radially distal end of the upper edge to an exducer portion of the primary blade, the exducer portion of the primary blade having an upper concave edge that extends radially outwardly and downwardly from the inducer portion and a radially distal vertical edge that extends downwardly from the upper edge of the exducer portion to the base portion.

12. The motor vehicle of claim 11, in which the angle between an axial direction of the hub portion and the angled section of the upper edge of the inducer portion of each of the plurality of primary blades is from 10 to 40 degrees.

13. The motor vehicle of claim 11, in which the angle between an axial direction of the hub portion and the angled section of the upper edge of the exducer portion of each of the plurality of primary blades is from 45 to 75 degrees.

14. The motor vehicle of claim 11, further comprising a plurality of secondary blades, each secondary blade being disposed between radially adjacent primary blades, and each secondary blade having a height and surface area that is less than the height and surface area of a primary blade.

15. The motor vehicle of claim 11, in which the compressor wheel has a height measured from a bottom of the base portion to a top of the hub portion and a diameter measured across the width of the base portion and includes an internally threaded bore extending axially along and terminating within the hub portion such that the internally threaded bore does not extend through a top of the hub portion.

* * * * *